US012422553B2

(12) United States Patent
Huh et al.

(10) Patent No.: US 12,422,553 B2
(45) Date of Patent: Sep. 23, 2025

(54) ELECTRONIC DEVICE COMPRISING CAMERA AND METHOD THEREOF

(71) Applicant: Samsung Electronics Co., Ltd., Gyeonggi-do (KR)

(72) Inventors: Jaeyoung Huh, Gyeonggi-do (KR); Johngy Lee, Gyeonggi-do (KR); Jonghoon Lim, Gyeonggi-do (KR); Seongeun Kim, Gyeonggi-do (KR); Kyungwoo Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 804 days.

(21) Appl. No.: 17/743,566

(22) Filed: May 13, 2022

(65) Prior Publication Data
US 2022/0268935 A1 Aug. 25, 2022

Related U.S. Application Data

(63) Continuation of application No. PCT/KR2020/015789, filed on Nov. 11, 2020.

(30) Foreign Application Priority Data

Nov. 14, 2019 (KR) .......... 10-2019-0145704

(51) Int. Cl.
G01S 17/894 (2020.01)
G01S 17/86 (2020.01)
(Continued)

(52) U.S. Cl.
CPC .............. G01S 17/86 (2020.01); G01S 17/89 (2013.01); H04N 23/64 (2023.01); H04N 23/667 (2023.01)

(58) Field of Classification Search
CPC .......... G01S 17/50; G01S 17/86; G01S 17/89; G01S 17/88; H04N 23/667; H04N 23/73;
(Continued)

(56) References Cited

U.S. PATENT DOCUMENTS 9,083,960 B2   7/2015  Wagner et al.
9,336,440 B2   5/2016  Ramachandran et al.
(Continued)

FOREIGN PATENT DOCUMENTS

CN    115118865 A  *  9/2022  .......... G01S 17/894
JP    2006-105604 A     4/2006
(Continued)

OTHER PUBLICATIONS

European Office Action dated Mar. 15, 2024.
(Continued)

Primary Examiner — Abdullahi Nur
(74) Attorney, Agent, or Firm — Cha & Reiter, LLC.

(57) ABSTRACT

According to an embodiment, an electronic device comprises: a camera module configured to acquire an image, wherein the image comprises a portion depicting at least one target object; a Time of Flight (ToF) sensor configured to generate depth data regarding the at least one target object; at least one processor operatively connected with the camera module and the ToF sensor; and at least one memory operatively connected with the at least one processor, wherein the at least one memory stores instructions that, when being executed, cause the at least one processor to perform a plurality of operations, the plurality of operations comprising: while acquiring the image by using the camera module, measuring a first distance between the at least one target object and the electronic device, based on the depth data from the ToF sensor; pause an operation of the ToF sensor when the measured first distance is longer than a
(Continued)

designated distance; while the operation of the ToF sensor is paused, measure a second distance between the at least one target object and the electronic device, using the camera module; and when the measured second distance is within the designated distance, resume the operation of the ToF sensor.

20 Claims, 15 Drawing Sheets

(51) Int. Cl.
    *G01S 17/89*      (2020.01)
    *H04N 23/60*      (2023.01)
    *H04N 23/667*    (2023.01)

(58) Field of Classification Search
    CPC ...... H04N 23/61; H04N 23/65; H04N 23/959; H04N 23/45; H04N 23/67; G06T 7/00; G06T 7/60; G06T 7/62
    See application file for complete search history.

(56) References Cited

U.S. PATENT DOCUMENTS

| | | | |
|---|---|---|---|
| 10,009,554 B1 | 6/2018 | Miao et al. | |
| 10,261,287 B2 | 4/2019 | Tang-Jespersen et al. | |
| 10,527,423 B1* | 1/2020 | Pavlyuk | G01C 21/005 |
| 11,397,077 B2* | 7/2022 | Deleule | G06T 7/521 |
| 2013/0235364 A1* | 9/2013 | Kyung | G01S 17/50 |
| | | | 356/5.01 |
| 2013/0293768 A1 | 11/2013 | Niyagawa | |
| 2014/0037135 A1 | 2/2014 | Kutliroff et al. | |
| 2015/0146926 A1 | 5/2015 | Ramachandran et al. | |
| 2015/0254868 A1 | 9/2015 | Srikanth et al. | |
| 2016/0094776 A1 | 3/2016 | Takahashi et al. | |
| 2018/0150709 A1 | 5/2018 | Ha | |
| 2018/0184056 A1 | 6/2018 | Kawai et al. | |
| 2019/0122373 A1 | 4/2019 | Natroshvili et al. | |
| 2019/0213309 A1* | 7/2019 | Morestin | G01S 17/04 |
| 2020/0184664 A1* | 6/2020 | Rhee | G01B 11/026 |
| 2020/0265600 A1* | 8/2020 | Oh | G06T 7/50 |

FOREIGN PATENT DOCUMENTS

| | | |
|---|---|---|
| JP | 2010-25906 A | 2/2010 |
| JP | 2012-163940 A | 8/2012 |
| JP | 5308088 B2 | 7/2013 |
| KR | 10-2015-0027137 A | 3/2015 |
| KR | 10-2016-0038842 A | 4/2016 |
| KR | 10-2016-0090843 A | 8/2016 |
| KR | 10-2018-0053333 A | 5/2018 |
| KR | 10-2018-0061835 A | 6/2018 |
| WO | 2017/044049 A1 | 3/2017 |
| WO | 2017038203 A1 | 3/2017 |

OTHER PUBLICATIONS

Korean Office Action dated May 27, 2024.
Korean Notice of Patent Grant dated Jan. 21, 2025.
European Search Report dated Dec. 13, 2022.

* cited by examiner

ELECTRONIC DEVICE COMPRISING CAMERA AND METHOD THEREOF

CROSS-REFERENCE TO RELATED APPLICATION(S)

This application is a continuation of PCT Application No. PCT/KR2020/015789, filed Nov. 11, 2020, and published as WO 2021/096219, that in turn claims priority to Korean Patent Application 10-2019-0145704 filed in the Korean Intellectual Property Office on Nov. 14, 2019.

BACKGROUND

Technical Field

Certain embodiments of the disclosure relate to an electronic device including a camera, and an operating method thereof.

Description of Related Art

As functions of electronic devices are developing, camera performance is improved and an image desired by a user may be photographed with a high resolution. In addition, an electronic device may enhance user's convenience by utilizing depth information according to distances between the electronic device and target objects (for example, a subject, an external object, etc.).

An electronic device may include a time of flight (ToF) module to acquire distance information for a target object. However, there are limits to the distance that can be measured using ToF. Within a certain distance, a measurement based on ToF may have a reasonable margin of error. However, beyond the certain distance, the margin of error becomes unacceptably large. Moreover, ToF consumes power, even in cases where the margin of error is unacceptably large.

SUMMARY

According to an embodiment, an electronic device comprises: a camera module configured to acquire an image, wherein the image comprises a portion depicting at least one target object; a Time of Flight (ToF) sensor configured to generate depth data regarding the at least one target object; at least one processor operatively connected with the camera module and the ToF sensor; and at least one memory operatively connected with the at least one processor, wherein the at least one memory stores instructions that, when being executed, cause the at least one processor to perform a plurality of operations, the plurality of operations comprising: while acquiring the image by using the camera module, measuring a first distance between the at least one target object and the electronic device, based on the depth data from the ToF sensor; pause an operation of the ToF sensor when the measured first distance is longer than a designated distance; while the operation of the ToF sensor is paused, measure a second distance between the at least one target object and the electronic device, using the camera module; and when the measured second distance is within the designated distance, resume the operation of the ToF sensor.

According to an embodiment, a method of operation of an electronic device, comprises: while acquiring an image comprising a portion depicting at least one target object by a camera module, generating depth data for the at least one target object using a Time of Flight (ToF) sensor; measuring a first distance between the at least one target object and the electronic device, based on the depth data; pausing an operation of the ToF sensor when the measured first distance is longer than a designated distance; while the operation of the ToF sensor is paused, measuring a second distance between the at least one target object and the electronic device, using the camera module; and when the measured second distance is within the designated distance, resuming the operation of the ToF sensor.

DETAILED DESCRIPTION

According to certain embodiments of the disclosure, the electronic device may determine whether a target object gets out of a designated threshold distance while acquiring distance information on the target object, and may at least temporarily pause an operation of a sensor for acquiring distance information based on the determination, so that power consumption of the electronic device may be reduced.

In addition, according to certain embodiments of the disclosure, the electronic device may enhance accuracy of distance information by changing a measurement parameter for acquiring distance information, while a target object is getting out of a designated threshold distance.

The effects achieved in the disclosure are not limited to those mentioned above, and other effects that are not mentioned above may be clearly understood to those skilled in the art based on the description provided below. Hereinafter, certain embodiments of the disclosure will be described in detail with reference to the accompanying drawings. In the following description, detailed descriptions of well-known functions or configurations will be omitted since they would unnecessarily obscure the subject matters of the disclosure. Also, the terms used herein are defined according to the functions of the disclosure. Thus, the terms may vary depending on users' or operators' intentions or practices. Therefore, the terms used herein should be understood based on the descriptions made herein.

Figure 1:
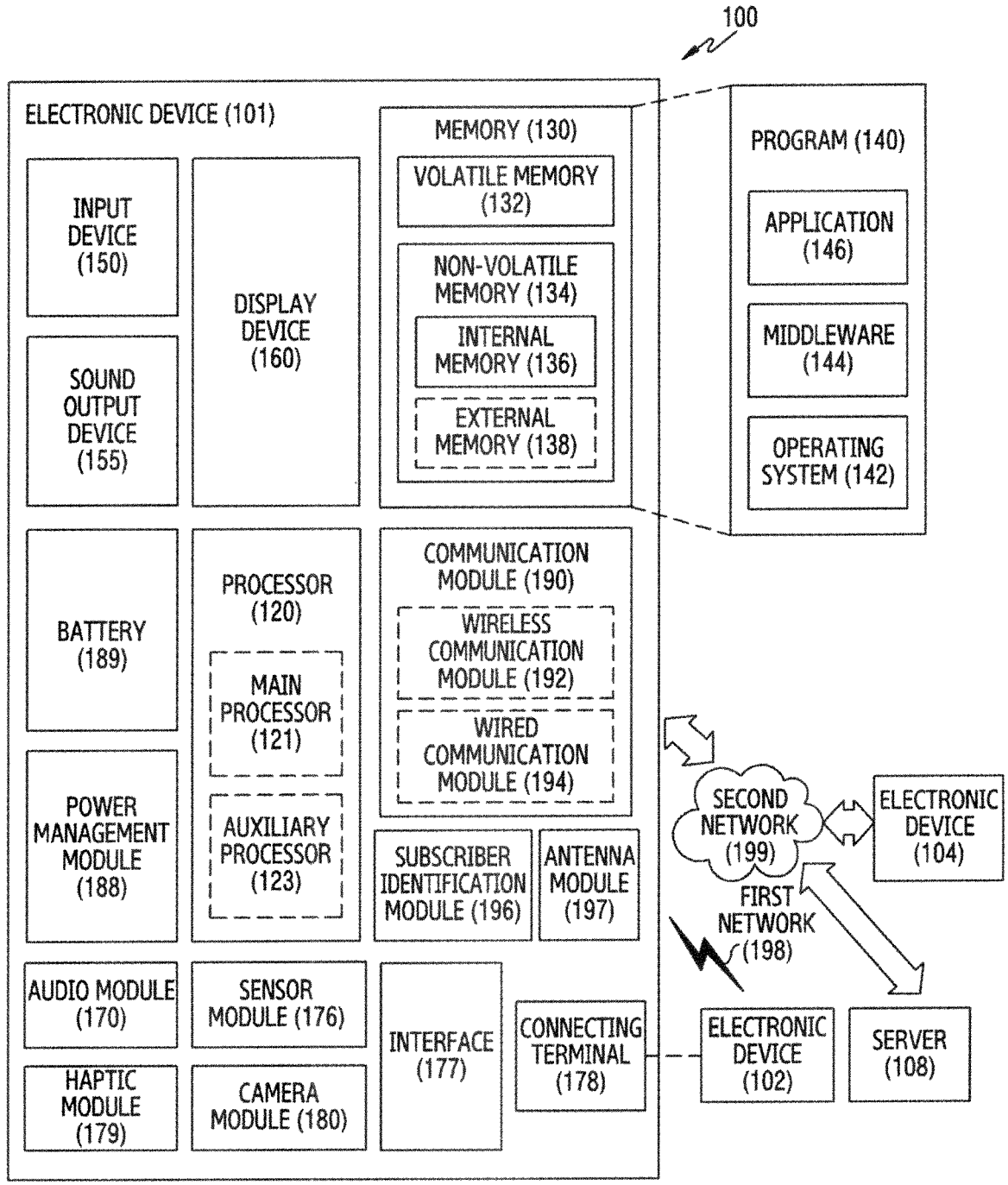
FIG. 1 is a block diagram illustrating an electronic device 101 in a network environment 100 according to certain embodiments.

FIG. 1 is a block diagram of an electronic device with a camera. The camera can be used to take images of the external scene. The image may depict one or more target objects. The depth information for the target objects can be determined in a number of different ways, including ToF.

Electronic Device

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The sensor module 176 may include sensor(s) that are configured to determine the depth of a target object in proximity to the electronic device 101 that is photographed by the camera module 180.

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The term "processor" as used in this document shall be understood to refer to both the singular and plural contexts.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device 101 includes a camera module 180 that is configured to capture an image of a scene proximate to the electronic device 101. The scene may include at least one target object, and at least a portion of the image may depict the object.

Figure 2:
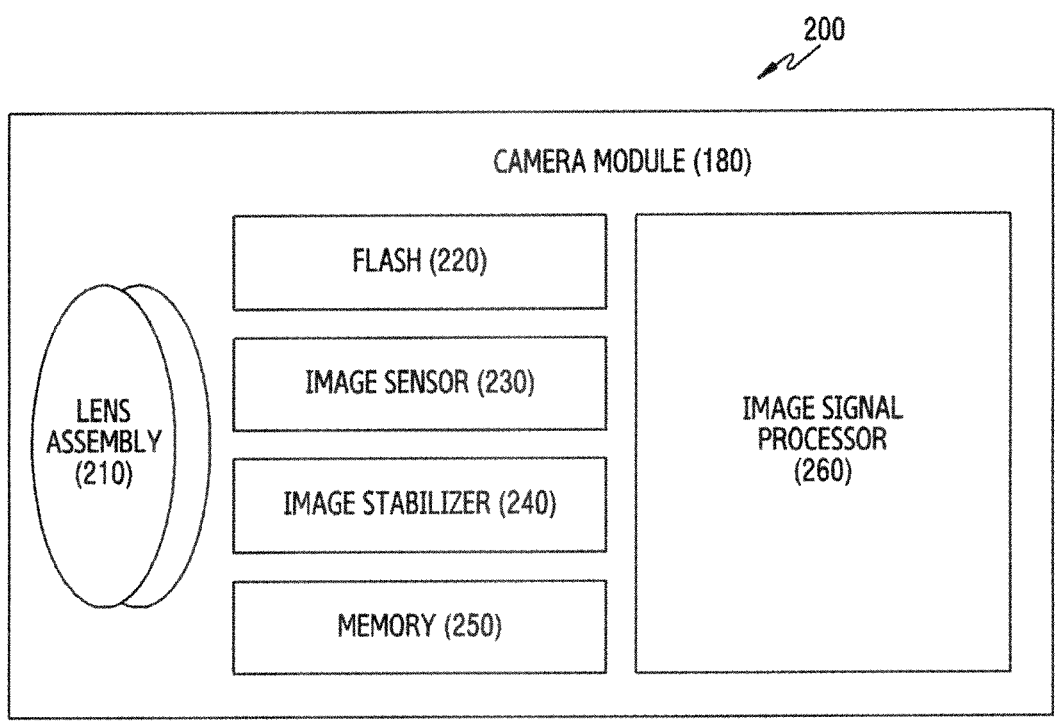
FIG. 2 is a block diagram 200 illustrating the camera module 180 according to certain embodiments.

FIG. 2 describe the camera module 180.

Camera Module

FIG. 2 is a block diagram 200 illustrating the camera module 180 according to certain embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

It is noted that the camera module 180 depicted is only one embodiment, and other embodiments may include additional components, omit certain components, and modify certain components described above.

Figure 3:
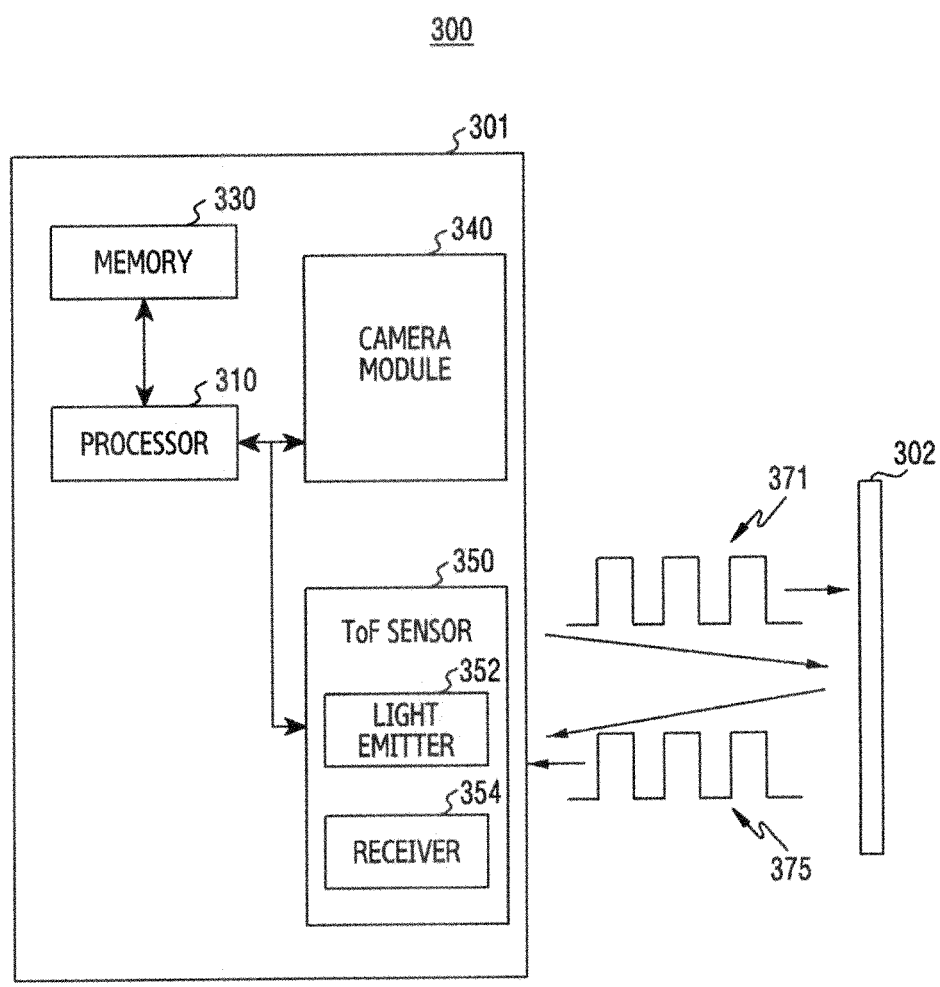
FIG. 3 is a view illustrating an example of a functional configuration of an electronic device according to an embodiment.
Figure 4:
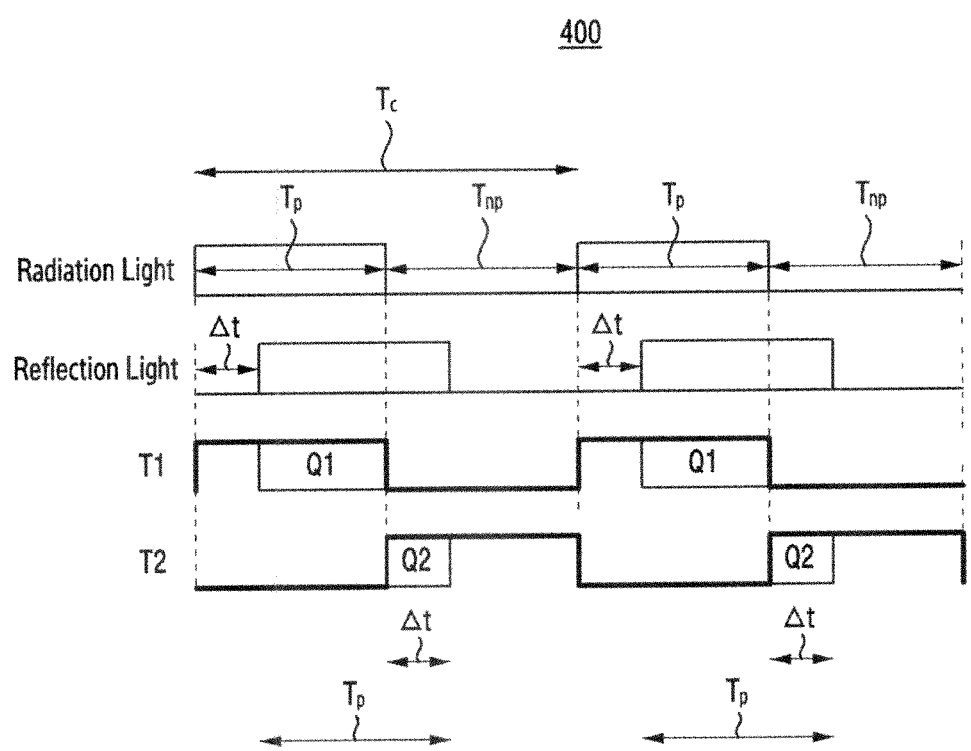
FIG. 4 is a timing chart to explain an example of an operation of an electronic device according to an embodiment.

FIG. 3 illustrates a configuration 300 of a portion of an electronic device 301 according to an embodiment. FIG. 4 is a timing chart for explaining an example 400 of an operation of an electronic device (for example, the electronic device 301 of FIG. 3) according to an embodiment. In certain embodiments, the electronic device 301 may correspond to the electronic device 101 of FIG. 1.

Referring to FIG. 3, the electronic device 301 may include a processor 310, a memory 330, a camera module 340, and a ToF sensor 350.

The camera module 340 may photograph a still image and a moving image. According to an embodiment, the camera module 340 may include one or more lenses, image sensors, image signal processors, or flashes. For example, in certain embodiments, the camera module 340 can comprise the camera module 180 of FIG. 2, though not so limited.

The ToF sensor 350 may acquire distance information (or depth information) between the electronic device 301 and a target object (for example, a subject) 302. The ToF sensor 350 may emit a light to radiate the target object using a light emitter 352. The target object reflects the light. The reflected light is received by a receiver 354. The distance of the target object is one-half the time of flight times the speed of light.

The ToF sensor 350 may include a light emitter 352 and a receiver 354, or a combination thereof. For example, the light emitter 352 may include one or more vertical-cavity surface emitting lasers (VCSELs), light emitting diodes (LEDs) (for example, a red-green-blue (RGB) LED, a white LED, an infrared LED, or an ultraviolet LED), or a xenon lamp. In addition, the receiver 354 may be configured by an RGB sensor, a black and white (BW) sensor, an infrared sensor, an ultraviolet sensor, or a combination thereof. For example, an image sensor included in the receiver 354 may be implemented by using a charged coupled device (CCD) sensor, a complementary metal oxide semiconductor (CMOS) sensor, or a combination thereof.

The ToF sensor 350 may radiate radiation light 371 of a designated frequency to the target object 302 (for example, a subject, an external object, etc.) for a radiation time $T_p$ of a designated repeating period $T_c$, and not radiate the radiation light 371 for a non-radiation time $T_{np}$ of the designated period $T_c$.

In addition, the ToF sensor 350 may receive reflection light 375 from the target object 302 for a time of an interval corresponding to the radiation time $T_p$ by using the receiver 354. According to an embodiment, there may be a difference between a radiation time of the radiation light 371 and a reception time of the reflection light 375 as long as a time $\Delta_t$ corresponding to a distance to the target object 302.

The receiver 354 may include at least two capacitors T1, T2. For example, the first capacitor T1 may switch from an off state to an on state for the radiation time $T_p$ of the designated period $T_c$, and may switch from an on state to an off state for the non-radiation time $T_{np}$. In addition, the second capacitor $T_2$ may switch from an on state to an off state for the radiation time $T_p$ of the designated period $T_c$, and may switch from an off state to an on state for the non-radiation time $T_{np}$. The at least two capacitors T1, T2 may accumulate quantities of electric charges (Q1, Q2) corresponding to a quantity of the reflection light 375 which enters while the capacitors are in the on state. The electric charges accumulated in the two capacitors T1, T2 may be electric charges which are generated in response to light received by the receiver.

The ToF sensor 350 may provide a distance D (or information indicating) between the electronic device 301 and the target object 302 to the processor 310, or may transmit the time difference $\Delta_t$ (or information indicating). In certain embodiments, the ToF sensor 350 integrated into the housing of the camera module 340. According to an embodiment, the camera module 340 and the ToF sensor 350 may be configured by a single sensor, for example, an image sensor. However, this is merely an example and embodiments of the disclosure are not limited thereto.

In certain embodiments, the light emitter 352 may be a flash (see FIG. 2, flash 220) and the receiver 352 may be an image sensor (see FIG. 2, image sensor 230). Thus, the camera module 340 and the ToF sensor 350 may be, but are not necessarily separate and distinct components.

The processor 310 may control at least one other component (for example, the memory 330, the camera module 340 or the ToF sensor 350) of the electronic device 301 which is connected to the processor 310.

In response to an input to measure a distance to the target object 302, the processor 310 may enable the ToF sensor 350. The ToF sensor 350 may acquire distance information between the electronic device 301 and the target object 302. For example, the input to measure the distance to the target object 302 may be received through a screen provided by a certain application. For example, the input to measure the distance to the target object 302 may be an input to execute a certain application (for example, a camera application). However, this is merely an example, and embodiments of the disclosure are not limited thereto. For example, the input to measure the distance to the target object 302 may be received through at least one of a voice command, a button input, a gesture input.

The processor 310 may calculate the distance D between the electronic device 310 and the target object 302, based on following <Equation 1>:

$$D = \frac{1}{2} \cdot c \cdot \Delta_t = \frac{1}{2} \cdot c \cdot T_p \cdot \frac{Q2}{Q1 + Q2} \qquad \text{Equation 1}$$

In <Equation 1>, c is a constant indicating a velocity of light (c=3*10^8 m/s), $\Delta_t$ indicates a time difference between a radiation time of the radiation light 371 and a reception time of the reflection light 375, $T_p$ is a radiation time, Q1 is a quantity of electric charges accumulated by the capacitor $T_1$ which switches to an on state for the radiation time $T_p$, and Q2 is a quantity of electric charges accumulated by the capacitor $T_2$ which switches to an on-state for the non-radiation time $T_{np}$.

The processor 310 may distinguish between a background and a target object in an image photographed through a camera, based on the distance information. For example, the processor 310 may distinguish between at least a portion (for example, background) included in the image and the other portion, based on the measured distance information, and may applying different effects (for example, a blur effect) to based on whether portion is in the background.

In addition, the processor 310 may identify at least one target object included in the image, based on the measured distance information, and may provide a service (for example, an Augmented Reality Ruler service, a map service, a mixed reality service, etc.) of measuring at least one of a distance between the electronic device and the target object 302, a size of the target object 302, and a thickness of the target object 302. However, the foregoing are merely examples and embodiments of the disclosure are not limited hereto.

It is noted that the distance information measured by the ToF sensor 350 will have a margin of error. The margin of error may increase as the distance information increases. When the distance exceeds a threshold, the margin of error may be unacceptably large. Accordingly, distance can be measured by the camera module 340.

In response to the distance measured by the ToF sensor 350 exceeding a threshold, the processor 310 may measure distance information using the camera module 340. The threshold distance may be a distance between the electronic device 301 and the target object 302 that guarantees that an error of a distance measured by the ToF sensor 350 is less than or equal to a predetermined level. The predetermined level may be user settable. For example, when the measured distance is out of the threshold distance, the processor 310 may pause operating the ToF sensor 350 and may acquire distance information by using the camera module 340. For example, the processor 310 may pause operating the ToF sensor 350 and prevent unnecessary power consumption, and may identify a time to resume the operation of the ToF sensor 350 (for example, identifying the target object 302 existing within the threshold distance) by using the camera module 340 which relatively less consumes power than the ToF sensor 350. However, this is merely an example, and embodiments of the disclosure are not limited thereto.

For example, the processor 310 may pause the operation of the ToF sensor 350 for a designated time, and may temporarily operate after the designated time and may identify a time to resume the operation of the ToF sensor 350. According to an embodiment, the processor 310 may pause providing the service based on the distance while acquiring distance information by using the camera module 340. For example, the processor 310 may notify a message informing that the operation of the ToF sensor 350 is paused.

When the distance measured by using the camera module 340 is included within the threshold distance, the processor 310 may process to resume the paused operation of the ToF sensor 350. For example, the processor 310 may measure distance information by using the ToF sensor 350, and may provide the service based on the measured distance information.

According to an embodiment, the processor 310 may change a measurement parameter while the ToF sensor 350 is operating. The measurement parameter may include a frequency of radiation (for example, a frequency), a radiation period (for example, an exposure time), a frame rate, etc. of the light emitter 352

For example, the processor 310 may change the measurement parameter based on a position of the target object 302. For example, as the distance to the target object 302 from the electronic device 301 is shorter, the processor 310 may reduce the radiation period and may increase the frequency of radiation (that is, reduce $T_c$). In addition, as the distance to the target object 302 from the electronic device 301 is longer, the processor 310 may increase the radiation period and may reduce the frequency of radiation (increase $T_c$).

In addition, the processor 310 may reduce the frame rate in order to reduce power consumption while the ToF sensor 350 is operating. In another example, the processor 310 may change the measurement parameter based on a photographing environment. The photographing environment may be related to a type of the target object 302. For example, when the target object 302 is a person who relatively less moves, the processor 310 may acquire distance information on the target object 302 by using a pre-designated reference parameter. In addition, when the target object 302 relatively more moves, the processor 310 may change the measurement parameter to extend a distance measurement range, for example, the threshold distance. For example, the processor 310 may extend the distance measurement range by increasing the radiation period and reducing the frequency of radiation.

The memory 330 may include data necessary for measuring a distance to the target object 302. The memory may include data related to a measurement parameter and a threshold distance. The measurement parameter may include a frequency of radiation (for example, a frequency), a radiation period (for example, an exposure time), a frame rate, etc. of the light emitter, as described above. However, this is merely an example and embodiments of the disclosure are not limited thereto. For example, the measurement parameter may include various parameters such as an intensity of radiation of the light emitter. For example, the measurement parameter may be defined according to a measurement environment. For example, a measurement parameter suitable for a target object 302 which relatively less moves, and a measurement parameter suitable for a target object 302 which relatively more moves may be distinguished and may be stored. In another example, the measurement parameter may be defined according to a distance to the target object 302. In addition, the measurement parameter may include a parameter that should be changed to extend the threshold distance.

An electronic device (for example, the electronic device 301) may include: a camera module (for example, the camera module 340) configured to acquire an image, wherein the image comprises a portion depicting at least one target object; a ToF sensor (for example, the ToF sensor 350) configured to generate depth data regarding the at least one target object; at least one processor (for example, the processor 310) operatively connected with the camera module and the ToF sensor; and at least one memory (for example, the memory 330) operatively connected with the at least one processor. According to an embodiment, the at least one memory may store instructions that, when being executed, cause the at least one processor to perform a plurality of operations, the plurality of operations comprising: while acquiring the image by using the camera module, measuring a first distance between the at least one target object and the electronic device, based on the depth data generated using the ToF sensor; pause an operation of the ToF sensor when the measured first distance is longer than a designated distance; while the operation of the ToF sensor is paused, measuring a second distance between the at least one target object and the electronic device, using the camera module; and, when the measured second distance is within the designated distance, resume the operation of the ToF sensor.

According to an embodiment, the plurality of operations further comprises measuring the second distance based on an auto focusing function of the camera module.

According to an embodiment, the plurality of operations further comprises providing a notification that the measured first distance is longer than the designated distance.

According to an embodiment, the plurality of operations further comprises providing a notification including information for guiding movement of the electronic device within the designated distance of the at least one target object.

According to an embodiment, to the plurality of operations further comprises, when an input instructing the operation of the ToF sensor is received in a state where the measured first distance is longer than the designated distance, extend the designated distance, to generate depth data regarding a target object of the at least one target object existing within the extended designated distance, and to provide a service based on the generated depth data.

According to an embodiment, the plurality of operations comprises extending the designated distance by changing at least one of a frequency of radiation (for example, a frequency), a radiation period (for example, an exposure time), a frame rate of a light emitter (for example, the light emitter 352) related to the ToF sensor.

According to an embodiment, the plurality of operations comprises, when it is not possible to measuring the second distance by using the camera module, measuring the second distance by using the ToF sensor.

According to an embodiment, the instructions may cause the processor to, when it is impossible to calculate the second distance by using the ToF sensor, terminate a function related to the ToF sensor.

According to an embodiment, the plurality of operations further comprises: generating depth data while changing a measurement parameter of the reoperated ToF sensor; and providing a service based on the generated depth data. According to an embodiment, the measurement parameter may include at least one of a frequency of radiation, a radiation period, a frame rate of a light emitter related to the ToF sensor.

According to an embodiment, the plurality of operations comprises changing the measurement parameter based on at least one of a photographing mode or environmental information. According to an embodiment, the photographing mode may include at least one of a moving image mode or a still image mode. In addition, the environmental information may include at least one of a movement of the at least one target object, a number of the at least one target object, a type of the at least one target object.

According to an embodiment, the ToF sensor may generate the depth data by using a time at which light reflected from an object arrives.

Figure 5:
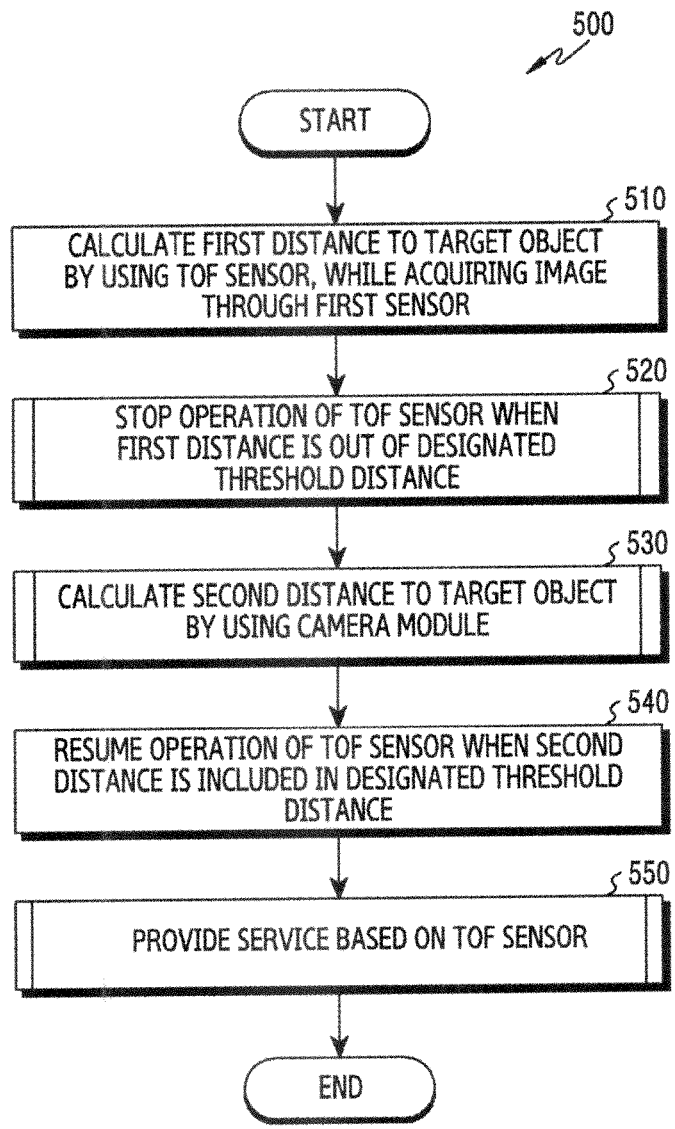
FIG. 5 is a flowchart for providing a service using depth information in an electronic device according to certain embodiments of the disclosure.

FIG. 5 is a flowchart 500 for providing a service using depth information in the electronic device 301 according to certain embodiments of the disclosure. In the following embodiment, respective operations may be performed in sequence, but may not necessarily be performed in sequence. For example, the order of the respective operations may be changed and at least two operations may be performed in parallel.

Referring to FIG. 5, according to an embodiment, in operation 510, the electronic device 301 (for example, the processor 310 of FIG. 3) may acquire a first distance (or depth) to a target object 302 while acquiring an image. The processor 310 may acquire the image through the camera module 340, and may acquire first distance information using the ToF sensor 350.

In operation 520, the electronic device 301 (for example, the processor 310 of FIG. 3) may pause the operation of the ToF sensor 350 when the first distance measured by the processor 310 is out of a designated threshold distance. As described above, the designated threshold distance may be a distance between the electronic device 301 and the target object 302 that guarantees that an error of a distance measured by using the ToF sensor 350 is less than or equal to a predetermined level.

In operation 530, the electronic device 301 (for example, the processor 310 of FIG. 3) may calculate a second distance to the target object 302 by using the camera module 340. According to an embodiment, the processor 310 may acquire at least one image by using the camera module 340, and may calculate a distance to the target object 302 based on the acquired image. For example, as will be described below through FIG. 11, the processor 310 may calculate the second distance based on auto focusing information through the at least one image. The electronic device 301 may include a plurality of camera modules 340. In this case, the processor 310 may calculate the second distance by using at least one camera module 340 that does not acquire an image among the camera modules 340 having the same sensing range as the sensing range (for example, a field of view (FoV)) of the ToF sensor 350. In certain embodiments, the camera module 340 may use stereoscopic images to determine distance.

In operation 540, the electronic device 301 (for example, the processor 310 of FIG. 3) may process to resume the paused operation of the ToF sensor 350. When the calculated second distance is included in the threshold distance, the processor 310 may process to resume the operation of the ToF sensor 350. In addition, when the calculated second distance is out of the threshold value, the processor 310 may determine a time to resume the operation of the ToF sensor 350, based on the second distance. For example, the processor 310 may repeat operations related to operations 530 and 540.

In operation 550, the electronic device 301 (for example, the processor 310 of FIG. 3) may provide a service based on the ToF sensor 350. The processor 310 may calculate a distance between the target object 302 and the electronic device 301 by using the ToF sensor 350, and may provide a service based on the calculated distance. For example, the processor 310 may provide at least one of information of the distance to the target object 302, a size of the target object 302, a thickness of the target object 302 as a part of the service.

Figure 6:
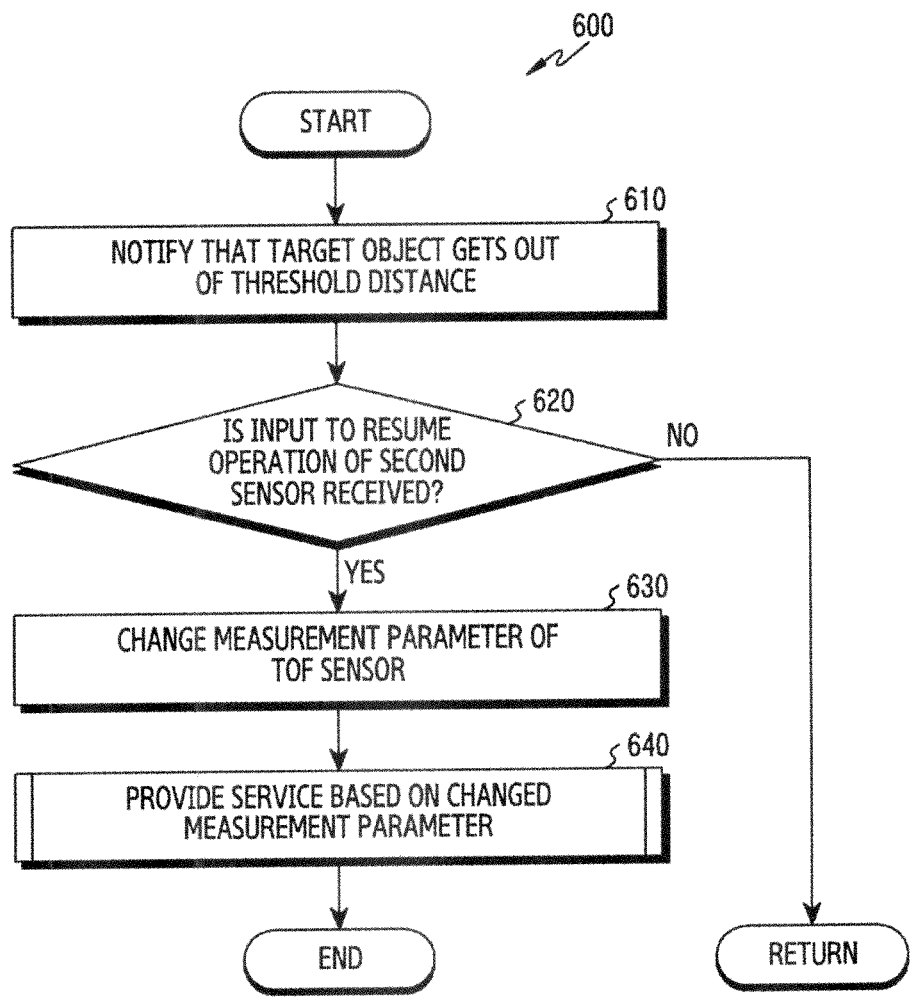
FIG. 6 is a flowchart for providing a service using depth information in an electronic device according to certain embodiments of the disclosure.
Figure 7:
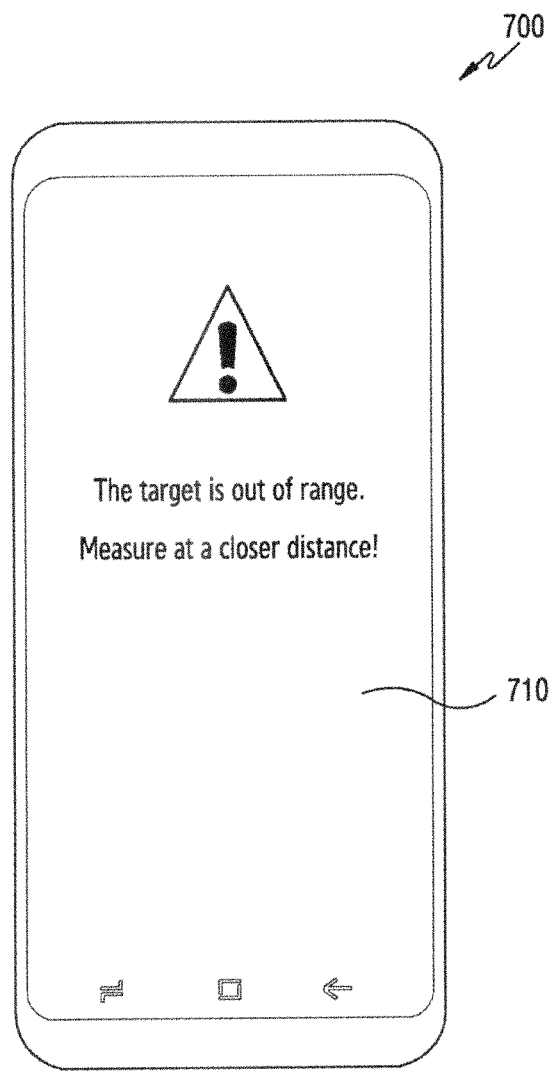
FIG. 7 is a view to explain an operation of notifying that a target object gets out of a threshold distance in an electronic device according to an embodiment of the disclosure.
Figure 8A:
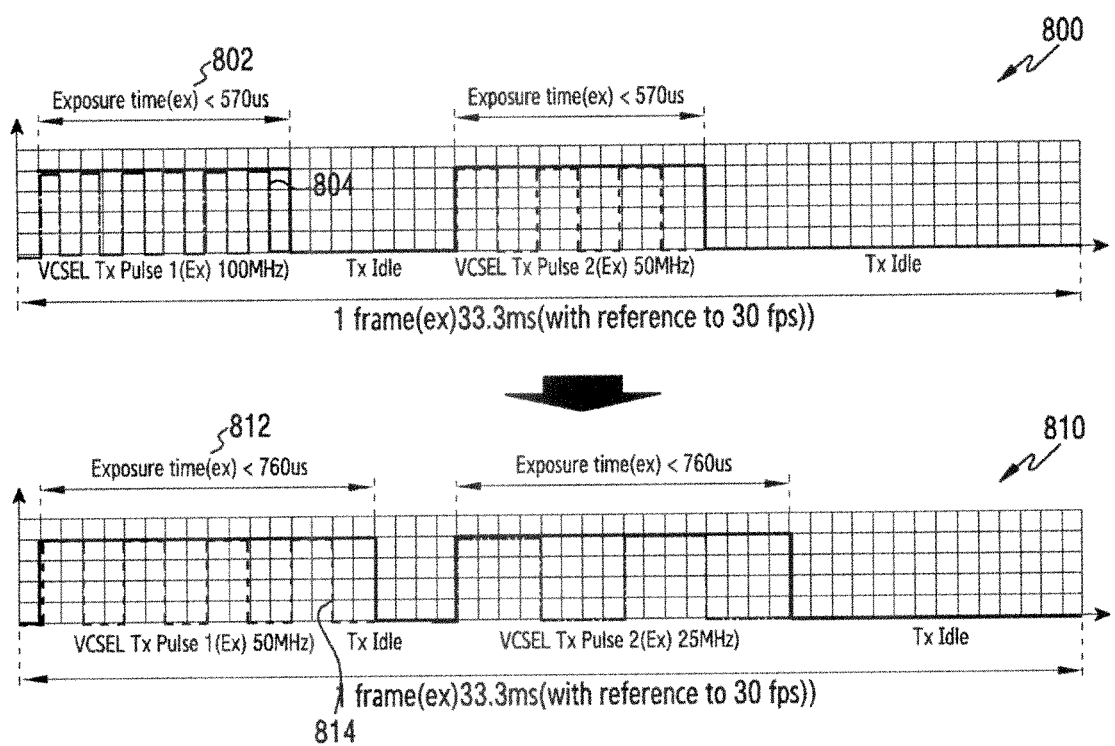
FIGS. 8A and 8B are views to explain an operation of changing a measurement parameter of a ToF sensor in an electronic device according to an embodiment of the disclosure.
Figure 8B:
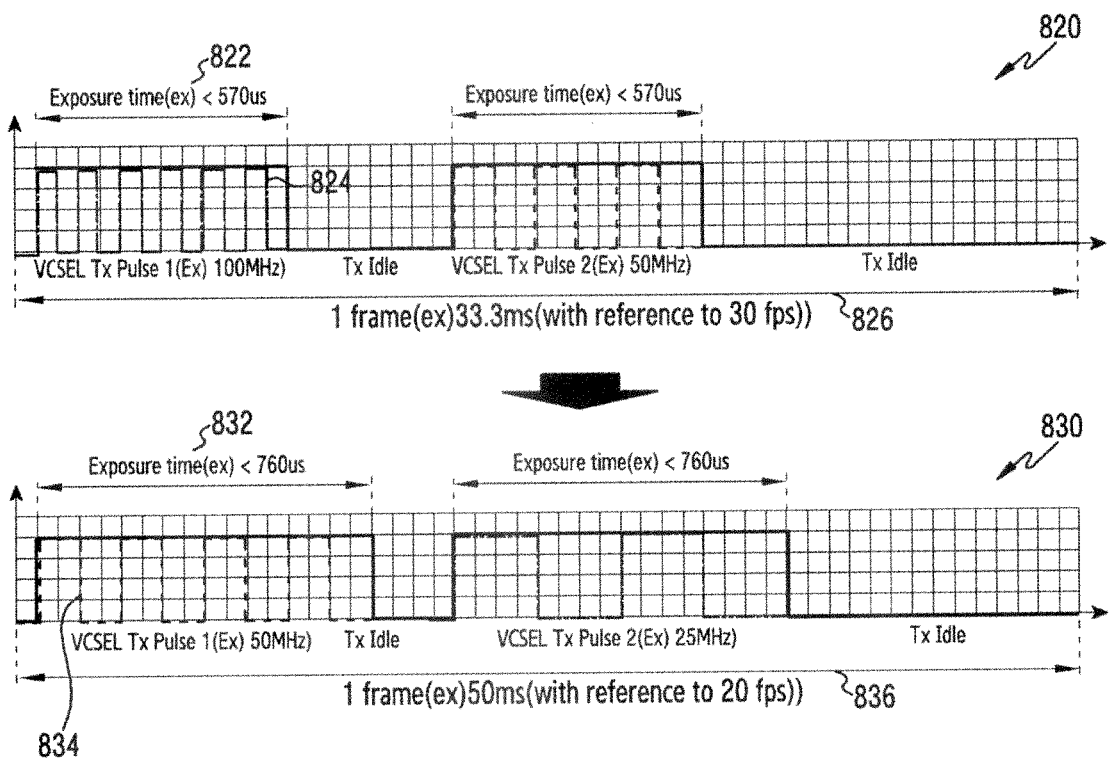

FIG. 6 is a flowchart 600 for providing a service using depth information in the electronic device 301 according to certain embodiments of the disclosure. FIG. 7 is a view 700 to explain an operation of notifying that the target object 302 gets out of a threshold distance in the electronic device 301 according to certain embodiments of the disclosure. FIGS. 8A and 8B are views to explain an operation of changing a measurement parameter of the ToF sensor 350 in the electronic device 301 according to certain embodiments. Operations of FIG. 6 described hereinbelow may indicate certain embodiments of operation 520 of FIG. 5. In addition, respective operations in the following embodiments may be performed in sequence, but may not necessarily be performed in sequence. For example, the order of the respective operations may be changed and at least two operations may be performed in parallel.

Referring to FIG. 6, according to an embodiment, in operation 610, the electronic device 301 (for example, the processor 310 of FIG. 3) may provide a notification that the target object 302 gets out of a threshold distance. The processor 310 may notify that it is not possible to measure a distance to the target object 302 (710) as shown in FIG. 7. "Impossible to measure" or "not possible" to measure shall be understood to also include a circumstance where the margin of error is excessive. The processor 310 may provide information for guiding to a region where it is possible to measure a distance (for example, "Move forward 1 meter!"). This notification may include at least one of a visual notification, a tactile notification, an auditory notification.

In operation 620, the electronic device 301 (for example, the processor 310 of FIG. 3) may determine whether a user input to resume the operation of the ToF sensor 350 is received. According to an embodiment, the user input may be an input instructing to measure the distance to the target object 302 although it is impossible to measure the distance to the target object 302.

When the user input to resume the operation of the ToF sensor 350 is not received, the electronic device 301 (for example, the processor 310 of FIG. 3) may pause the operation of the ToF sensor 350 and then may calculate a second distance to the target object 302 by using the camera module 340.

When the user input to resume the operation of the ToF sensor 350 is received, the electronic device 301 (for example, the processor 310 of FIG. 3) may change a measurement parameter of the ToF sensor 350 in operation 630. According to an embodiment, the processor 310 may change at least one measurement parameter in order to extend the threshold distance. The measurement parameter may include a frequency of radiation (for example, a frequency), a radiation period (for example, an exposure e time), a frame rate, etc. of the light emitter 352 For example, a parameter set as indicated by reference numeral 800 of FIG. 8A may be changed to a parameter as indicated by reference numeral 810. For example, the processor 310 may extend the threshold distance by increasing the radiation period of the light emitter 352 from 570 μs (802) to 760 μs (812), and reducing the frequency of radiation of the light emitter 352 from 100 MHz (804) to 50 MHz (814). By extending the threshold distance, the processor 310 may make it possible to measure a distance to the target object 302 which gets out of the basic threshold distance. In addition, the processor 310 may change a parameter set as indicated by reference numeral 820 of FIG. 8B to a parameter as indicated by reference numeral 830 in order to reduce power consumption while the ToF sensor 350 is operating. For example, the processor 310 may extend the threshold distance by increasing the radiation period of the light emitter 352 from 570 μs (822) to 760 μs (832), and reducing the frequency of radiation of the light emitter 352 from 100 MHz (824) to 50 MHz (834), and additionally, may prevent occurrence of power consumption by reducing the frame rate from 33.3 ms (826) to 50 ms (836) (for example, when the frame rate is reduced, power consumption may be reduced 0.88 times more than when the frame rate is not reduced.).

In operation 640, the electronic device 301 (for example, the processor 310) may provide a service based on the changed measurement parameter. According to an embodiment, the processor 310 may measure a distance to the target object which gets out of the basic threshold distance, with the extended threshold distance.

Figure 9:
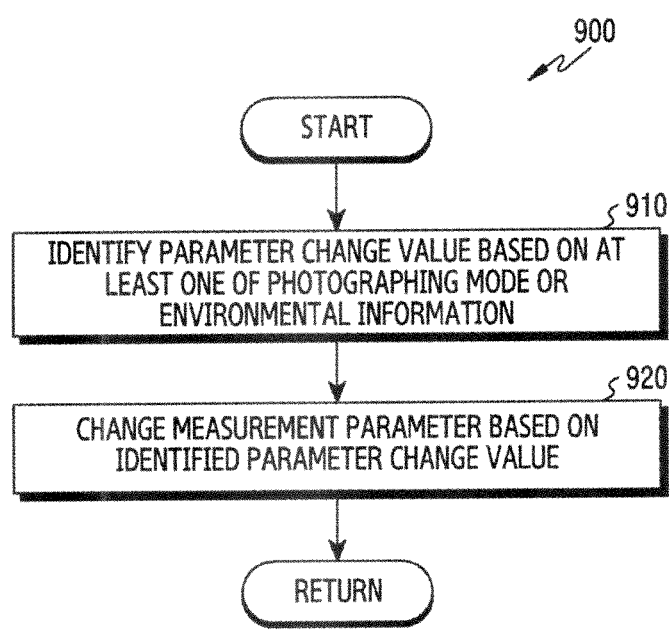
FIG. 9 is a flowchart for providing a service using depth information in an electronic device according to an embodiment of the disclosure.

FIG. 9 is a flowchart 900 for providing a service using depth information in the electronic device 301 according to certain embodiments of the disclosure. Operations of FIG. 9 described hereinbelow may indicate certain embodiments of operation 640 of FIG. 6. In addition, respective operations in the following embodiments may be performed in sequence, but may not necessarily be performed in sequence. For example, the order of the respective operations may be changed and at least two operations may be performed in parallel.

Referring to FIG. 9, according to an embodiment, in operation 910, the electronic device 301 (for example, the processor 310 of FIG. 3) may identify a parameter change value based on at least one of a photographing mode or environmental information. The photographing mode may include at least one of a moving image mode or a still image mode. In addition, the environmental information may include at least one of an environment in which a target object 302 moving relatively less is photographed, an environment in which a target object 302 moving relatively more is photographed, an environment in which a pre-designated target object 302 is photographed, an environment in which a single target object 302 is photographed, an environment in which a plurality of target objects 302 are photographed. According to an embodiment, an inside (for example, the memory 330) of the electronic device 301 may store parameters corresponding to respective photographing modes and respective photographing environments, and the processor 310 may identify at least one of the photographing modes and/or the environmental information, based on information (or signal) acquired from the camera module 340 and/or the ToF sensor 350. In addition, the processor 310 may determine a parameter value that should be changed, based on the stored parameter and the result of identifying.

According to an embodiment, in operation 920, the electronic device 301 (for example, the processor 310 of FIG. 3) may change a measurement parameter based on the identified parameter change value. For example, the processor 310 may variably extend the threshold distance by changing the parameter based on at least one of the photographing mode or the environmental information. According to an embodiment, the processor 210 may acquire distance information on the target object 302 by using the changed measurement parameter, and may provide a service by using the same.

Figure 10:
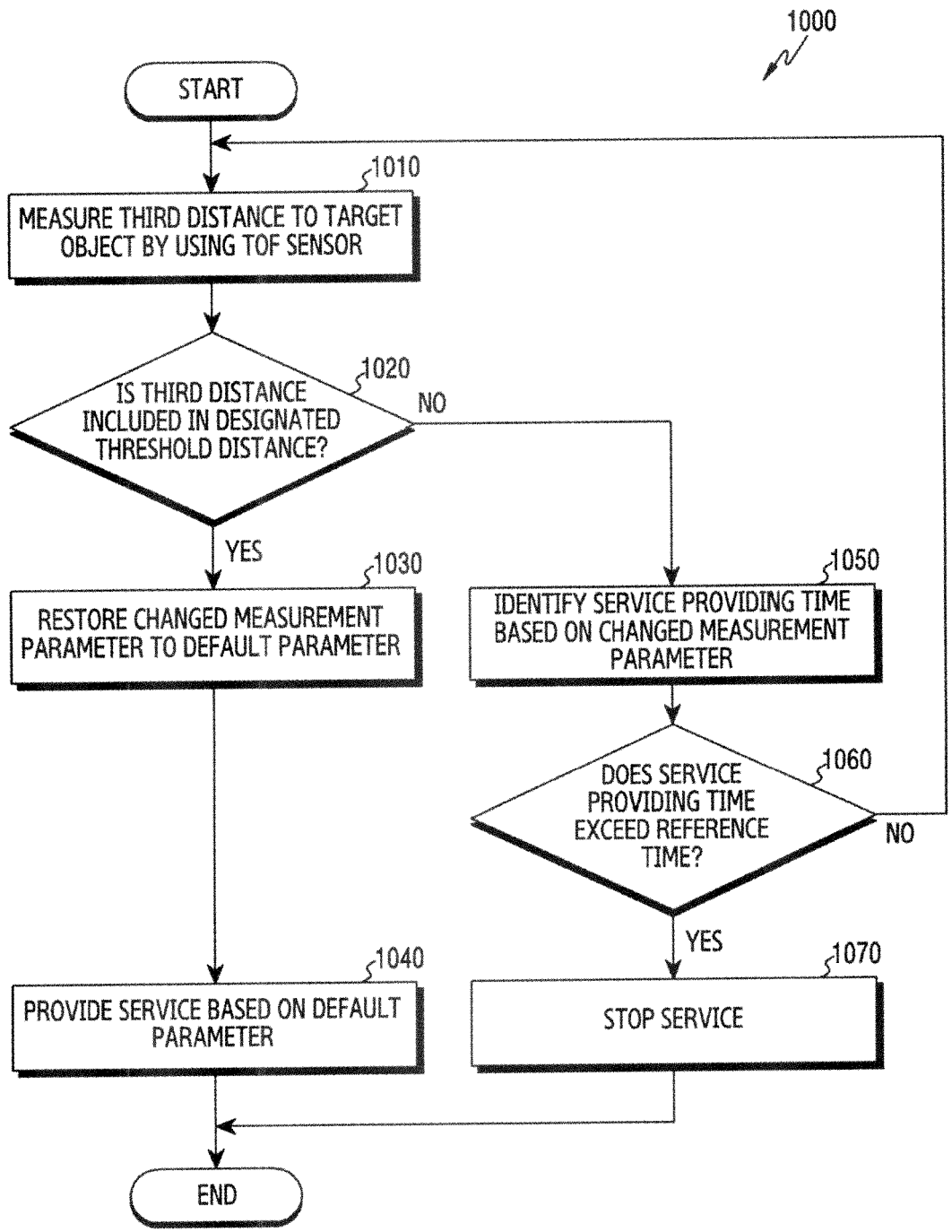
FIG. 10 is a flowchart for providing a service based on a changed measurement parameter in an electronic device according to an embodiment of the disclosure.

FIG. 10 is a flowchart 1000 for providing a service based on a changed measurement parameter in the electronic device 301 according to an embodiment of the disclosure. Operations of FIG. 10 described hereinbelow may indicate certain embodiments of operation 640 of FIG. 6. In addition, respective operations in the following embodiments may be performed in sequence, but may not necessarily be performed in sequence. For example, the order of the respective operations may be changed and at least two operations may be performed in parallel.

Referring to FIG. 10, according to an embodiment, in operation 1010, the electronic device 301 (for example, the processor 310 of FIG. 3) may measure a third distance to the target object 302 by using the ToF sensor 350.

In operation 1020, the electronic device 301 (for example, the processor 310 of FIG. 3) may determine whether the third distance is included in a designated threshold distance. As described above, the threshold distance may be a distance between the electronic device 301 and the target object 302 that guarantees that a margin of error of a distance measured by the ToF sensor 350 is less than or equal to a predetermined level. For example, the processor 310 may determine whether the target object 302 getting out of the threshold distance enters the threshold distance again by using the ToF sensor 350.

When the third distance is included in the designated threshold distance, in other words, when the target object 302 getting out of the threshold distance enters the threshold distance again, the electronic device 301 (for example, the processor 310 of FIG. 3) may restore the changed measurement parameter to the default parameter in operation 1030. According to an embodiment, the processor 310 may reduce power consumption of the electronic device 301 by restoring or changing the measurement parameter to correspond to the target object 302 which moves toward the electronic device 301. For example, the processor 310 may change the measurement parameter by reducing the radiation period to a predetermined level (for example, reducing from 760 μs to 570 μs) and increasing the frequency of radiation (for example, increasing from 50 MHz to 100 MHz). When the measurement parameter is restored to the default parameter, the electronic device 310 (for example, the processor 310 of FIG. 3) may provide a service based on the default parameter in operation 1040. According to an embodiment, the processor 310 may provide a service based on distance information of the ToF sensor 350 which is acquired based on the default parameter. For example, the processor 310 may perform at least one operation of operations 510 to 550 of FIG. 5.

When the third distance is not included in the designated threshold distance, in other words, when the target object 302 getting out of the threshold distance does not enter the threshold distance again, the electronic device 301 (for example, the processor 310 of FIG. 3) may identify a providing time of the service which is provided based on the changed measurement parameter in operation 1050. In addition, according to an embodiment, in operation 1060, the processor 310 may determine whether the service providing time exceeds a reference time. According to an embodiment, when the service providing time does not exceed the reference time, the processor 310 may perform the operation of measuring the third distance by using the ToF sensor 350. In addition, according to an embodiment, in operation 1070, the processor 310 may pause the service when the service providing time exceeds the reference time. According to an embodiment, with respect to the target object 302 getting out of the threshold distance, the processor 310 may determine that distance information may be acquired without guaranteeing accuracy, or power consumption of the electronic device 301 may continuously occur, and may pause providing the service.

Figure 11:
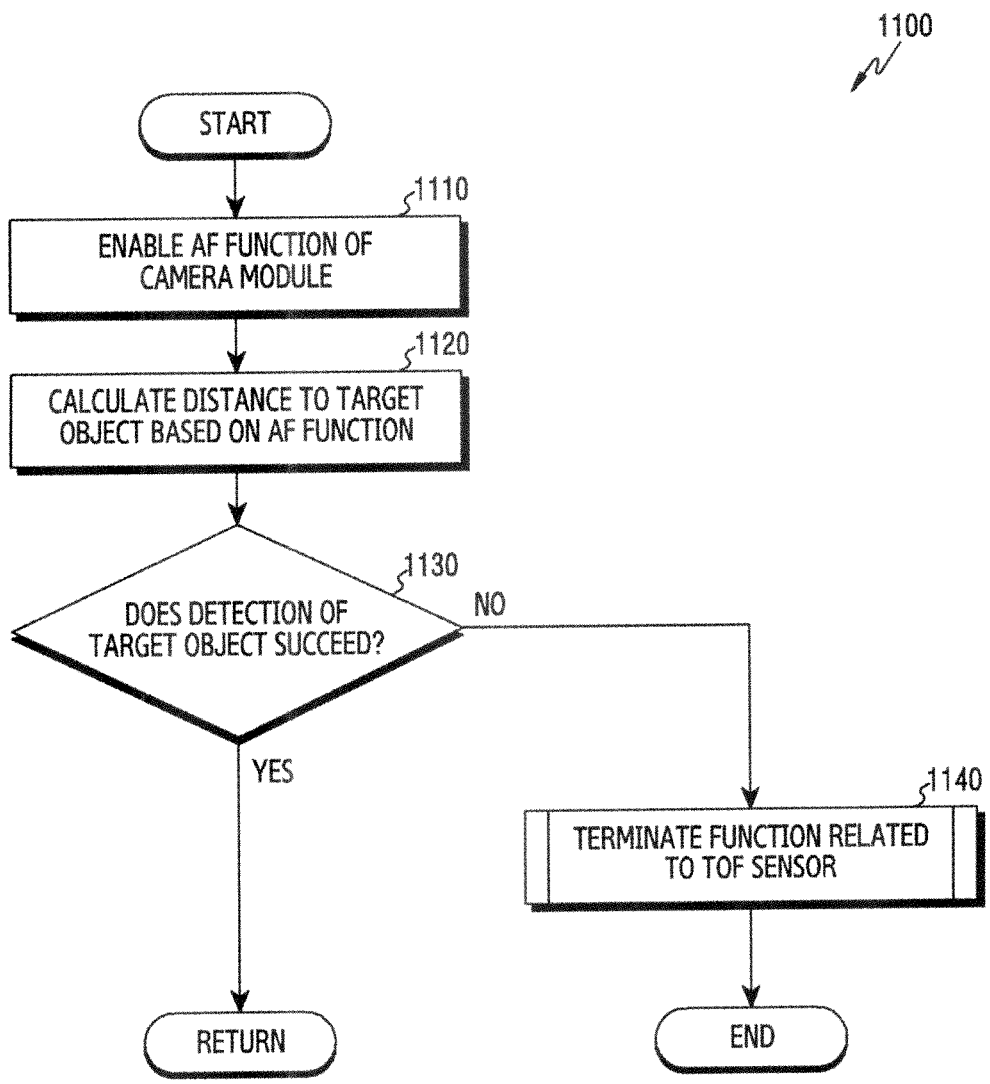
FIG. 11 is a flowchart for acquiring distance information on a target object by using a camera module in an electronic device according to an embodiment of the present disclosure.

FIG. 11 is a flowchart 1100 for acquiring distance information on the target object 302 by using the camera module 340 in the electronic device 301 according to an embodiment of the disclosure. Operations of FIG. 11 described hereinbelow may indicate certain embodiments of operation 530 of FIG. 5. In addition, respective operations in the following embodiments may be performed in sequence, but may not necessarily be performed in sequence. For example, the order of the respective operations may be changed and at least two operations may be performed in parallel.

Referring to FIG. 11, according to an embodiment, in operation 1110, the electronic device 301 (for example, the processor 310 of FIG. 3) may enable an auto focusing function of the camera module 340. The auto focusing function may include a search position determination operation and an on-focus area detection operation. For example, the search position determination operation may be an operation of determining a start position of the on-focus area detection operation. In addition, the on-focus area detection operation may be an operation of moving a focus lens with reference to a search position in phases and positioning in an on-focus area. The search position determination operation and the on-focus area detection operation described above may be referred to as various terms, and well-known various auto focusing functions may be performed in addition to the above-described auto focusing function.

In operation 1120, the electronic device 301 (for example, the processor 310 of FIG. 3) may calculate a distance to the target object 302 based on auto focusing information. The auto focusing information may include a focal distance to the target object 302, a moving distance of a lens, Etc. From the location of the lenses and the amount of movement, the focal distance can be determined. The distance to the target object 302 can be based on the focal distance of the lens assembly.

In operation 1130, the electronic device 301 (for example, the processor 310) may determine whether the target object 302 is detected by using the camera module 340.

When the target object 302 is detected by using the camera module 340, the electronic device 301 (for example, the processor 310 of FIG. 3) may compare the distance to the detected target object 302 with a threshold distance. According to an embodiment, the processor 301 may perform an operation related to operation 540 of FIG. 5.

When the target object 302 is not detected by using the camera module 340, the electronic device 301 (for example, the processor 310 of FIG. 3) may terminate the function related to the ToF sensor 350 in operation 1140. According to an embodiment, the processor 310 may pause providing the service based on the distance information on the target object 302.

Figure 12:
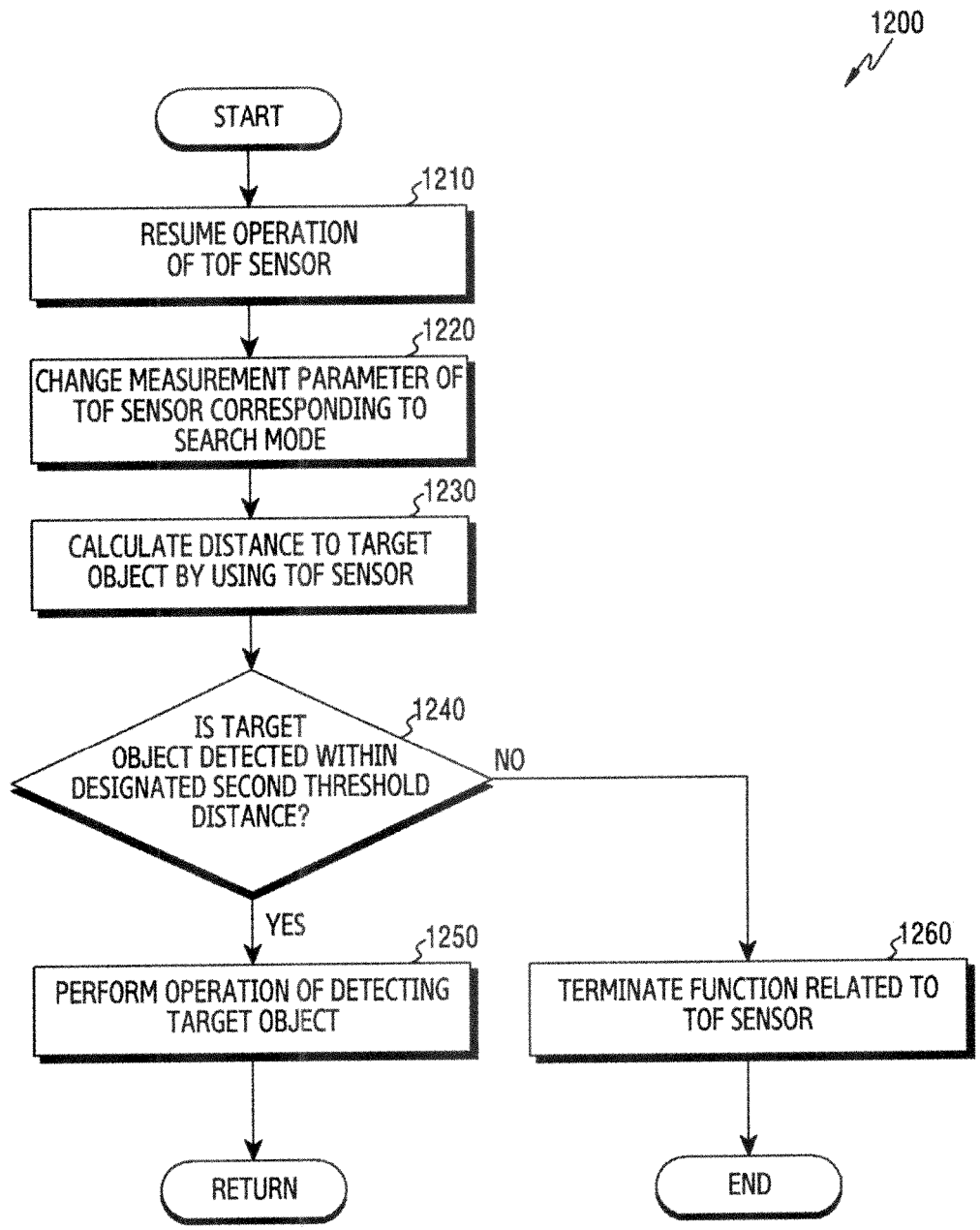
FIG. 12 is a flowchart for determining termination of a function related to a ToF sensor in an electronic device according to an embodiment of the present disclosure.

FIG. 12 is a flowchart 1200 for determining whether to terminate the function related to the ToF sensor 350 in the electronic device 301 according to an embodiment. Operations of FIG. 12 described hereinbelow may indicate certain embodiments of operation 1140 of FIG. 11. In addition, respective operations in the following embodiments may be performed in sequence, but may not necessarily be performed in sequence. For example, the order of the respective operations may be changed and at least two operations may be performed in parallel.

Referring to FIG. 12, according to an embodiment, in operation 1210, the electronic device 301 (for example, the processor 310 of FIG. 3) may resume the operation of the ToF sensor 350. The processor 310 may temporarily resume the operation of the ToF sensor 350 in response to the target object 302 not being detected through the camera module 340.

In operation 1220, the electronic device 301 (for example, the processor 310 of FIG. 3) may change a measurement parameter of the ToF sensor 350 corresponding to a search mode. The search mode may refer to a mode for searching the target object 302 getting out of the threshold distance. The processor 310 may set the radiation period of the light emitter 352 to a maximum and may set the frequency of radiation of the light emitter 352 to a minimum in order to search the target object 302 getting out of the threshold distance.

In operation 1230, the electronic device 301 (for example, the processor 310 of FIG. 3) may calculate a distance to the target object 302 by using the ToF sensor 350.

In operation 1240, the electronic device 301 (for example, the processor 310 of FIG. 3) may determine whether the target object 302 is detected within a designated second threshold distance. The second threshold distance may be a criterion for determining a possibility that the target object 302 enters the above-described threshold distance. According to an embodiment, the second threshold distance may be longer than the above-described threshold distance and may be equal to or shorter than a third threshold distance that is detected through a search mode.

When the target object 302 is detected within the designated second threshold distance, the electronic device 301 (for example, the processor 310 of FIG. 3) may perform an operation of detecting the target object 302 in operation 1250. According to an embodiment, the processor 310 may acquire distance information on the target object 302 by using the camera module 340 and/or the ToF sensor 350. For example, when the target object 302 is detected within the designated second threshold distance, it may be interpreted that there is a possibility that the target object 302 enters the above-described threshold distance. Accordingly, the processor 310 may operate the camera module 340 and/or the ToF sensor 350 for at least a predetermined time in order to acquire distance information on the target object 302.

When the target object 302 is not detected within the designated second threshold distance, in operation 1260, the electronic device 301 (for example, the processor 310 of FIG. 3) may terminate the function related to the ToF sensor 350. According to an embodiment, the processor 310 may pause providing the service based on the distance information on the target object 302 as described above. For example, when the target object 302 gets out of the designated second threshold distance, it may be interpreted that there is a low possibility that the target object 302 enters the above-described threshold distance. Accordingly, the processor 310 may pause the operation of acquiring distance information on the target object 302.

Figure 13:
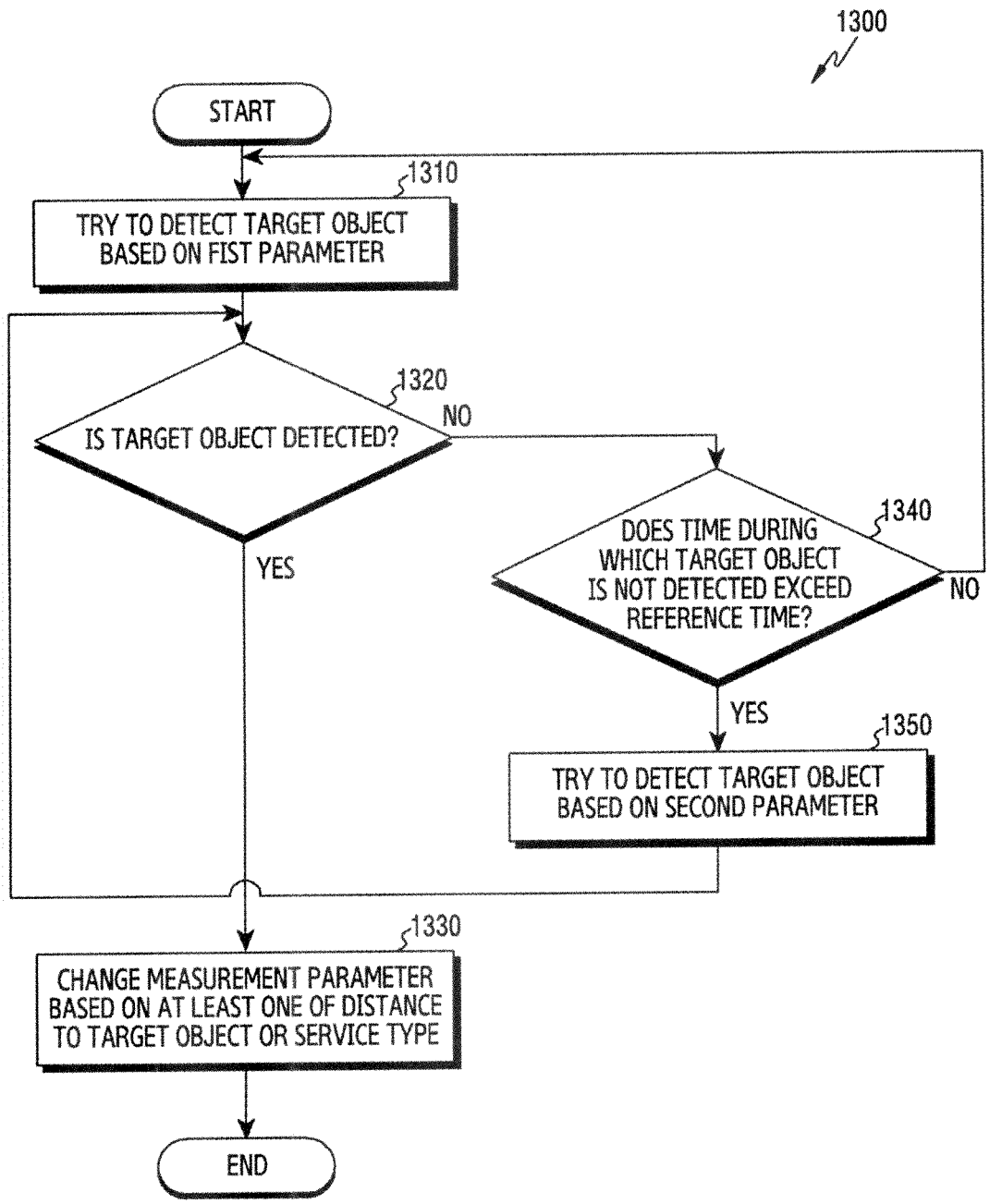
FIG. 13 is a flowchart for providing a service based on a ToF sensor in an electronic device according to an embodiment of the present disclosure.

FIG. 13 is a flowchart 1300 for providing a service based on the ToF sensor 350 in the electronic device 301 according to an embodiment of the disclosure. Operations of FIG. 13 described hereinbelow may indicate certain embodiments of operation 550 of FIG. 5. In addition, respective operations in the following embodiments may be performed in sequence, but may not necessarily be performed in sequence. For example, the order of the respective operations may be changed and at least two operations may be performed in parallel.

Referring to FIG. 13, according to an embodiment, in operation 1310, the electronic device 301 (for example, the processor 310 of FIG. 3) may try to detect the target object 302 based on a first parameter. The first parameter may be default setting regarding a parameter which is used for detecting the target object 302 existing within the threshold distance.

In operation 1320, the electronic device 301 (for example, the processor 310) may determine whether the target object 302 is detected by using the first parameter.

When the target object 302 is detected, the electronic device 301 (for example, the processor 310 of FIG. 3) may change a measurement parameter based on at least one of a distance to the target object 302 or a service type (for example, a photographing mode) in operation 1330.

In order to enhance accuracy of distance information, the processor 310 may reduce the radiation period of the light emitter 352 to a designated level, and may increase the frequency of radiation of the light emitter 352 to a designated level as the distance to the target object 302 is shorter. In addition, in order to enhance accuracy of distance information, the processor 310 may increase the radiation period of the light emitter 352 to a designated level, and may reduce the frequency of radiation of the light emitter 352 to a designated level as the distance to the target object 302 is longer. For example, when a plurality of target objects 302 are included in the sensing range (for example, a field of view (FoV)) of the ToF sensor 350, the processor 310 may change the measurement parameter with reference to a position of a target object 302 existing at the longest distance.

When a moving image mode requiring continuous photographing is performed, the processor 310 may increase the frame rate related to the ToF sensor 350 to a predetermined level in order to enhance accuracy of distance information. In addition, when a still image mode not requiring continuous photographing is performed, the processor 310 may reduce the frame rate related to the ToF sensor 350 to a predetermined level in order to enhance accuracy of distance information.

When the target object 302 is not detected, the processor 301 (for example, the processor 310 of FIG. 3) may determine whether a time during which the target object 302 is not detected exceeds a reference time in operation 1340.

When the time during which the target object 302 is not detected does not exceeds the reference time, the electronic device 301 (for example, the processor 310 of FIG. 3) may perform the operation of detecting the target object 302 based on the first parameter.

When the time during which the target object 302 is not detected exceeds the reference time, the electronic device 301 (for example, the processor 310 of FIG. 3) may try to detect the target object 302 based on a second parameter in operation 1350. According to an embodiment, the processor 310 may change the first parameter to the second parameter in order to extend a target object 302 detectable distance. For example, the processor 310 may change at least one of the frequency of radiation (for example, a frequency), the radiation period (for example, an exposure time), the frame rate of the light emitter 352 so as to make it possible to detect a target object existing out of the threshold distance. For example, the processor 310 may change the first parameter in which the radiation period of the light emitter 352 is set to 570 µs and the frequency of radiation of the light emitter 352 is set to 100 MHz, to the second parameter in which the radiation period of the light emitter 352 increases to 760 µs and the frequency of radiation of the light emitter 352 is reduced to 50 MHz.

Figure 14:
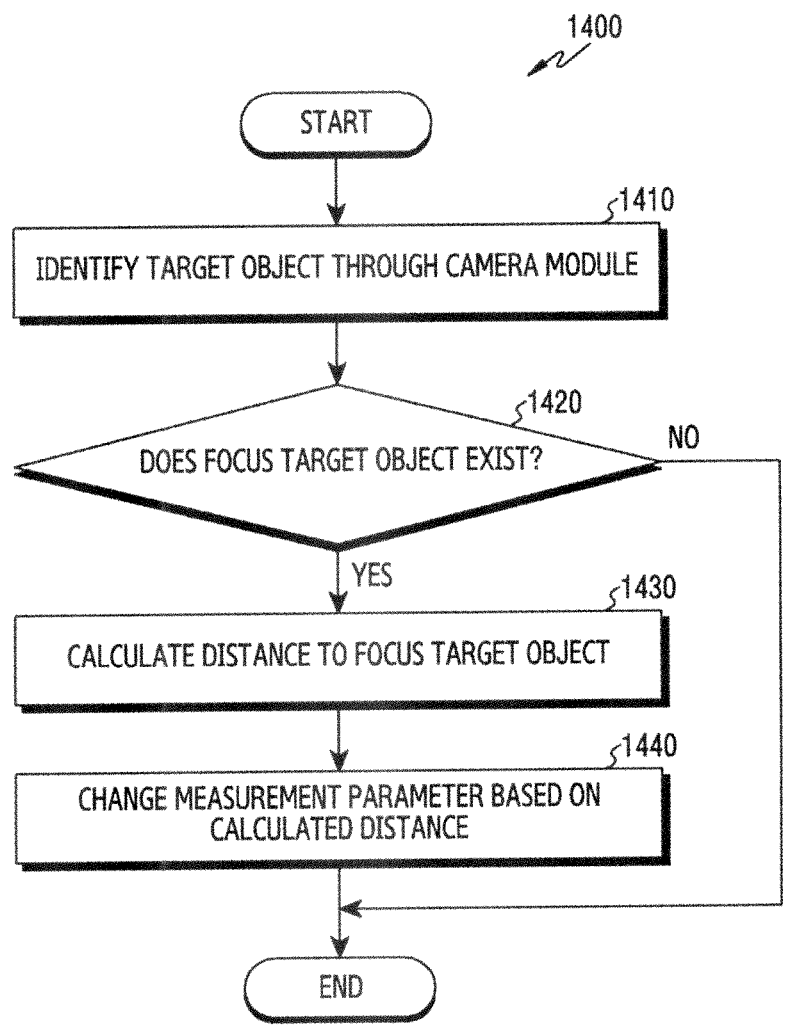
FIG. 14 is another flowchart for providing a service based on a ToF sensor in an electronic device according to an embodiment of the present disclosure.

FIG. 14 is another flowchart 1400 for providing a service based on the ToF sensor 350 in the electronic device 301 according to an embodiment of the disclosure. Operations of FIG. 14 described hereinbelow may indicate certain embodiments of operation 550 of FIG. 5. In addition, respective operations in the following embodiments may be performed in sequence, but may not necessarily be performed in sequence. For example, the order of the respective operations may be changed and at least two operations may be performed in parallel.

Referring to FIG. 14, according to an embodiment, in operation 1410, the electronic device 301 (for example, the processor 310 of FIG. 3) may identify a target object by using the camera module 340. According to an embodiment, the processor 310 may operate the camera module 340 in order to identify the target object while the ToF sensor 350 is operating.

In operation 1420, the electronic device 301 (for example, the processor 310 of FIG. 3) may determine whether there exists a focus target object. According to an embodiment, the focus target object may be a target object that the electronic device focuses on among target objects included in an image acquired through the camera module 340.

According to an embodiment, when there does not exist the focus target object, the electronic device 301 (for example, the processor 310 of FIG. 3) may acquire distance information on the target object based on a currently set parameter.

According to an embodiment, when there exists the focus target object, the electronic device 301 (for example, the processor 310 of FIG. 3) may calculate a distance to the focus target object in operation 1430. According to an embodiment, as described above, the processor 310 may calculate a distance to the target object 302 based on auto focusing information as described above.

According to an embodiment, in operation 1440, the electronic device 301 (for example, the processor 310 of FIG. 3) may change a measurement parameter based on the calculated distance. According to an embodiment, as the distance between the electronic device 301 and the focus target object is shorter, the processor 310 may reduce the radiation period of the light emitter 352 to a designated level, and may increase the frequency of radiation of the light emitter 352 to a designated level. In addition, as the distance between the electronic device 301 and the focus target object is longer, the processor 310 may increase the radiation period of the light emitter 352 to a designated level, and may reduce the frequency of radiation of the light emitter 352 to a designated level.

According to an embodiment, a method of operation of an electronic device (for example, the electronic device 301) may include: while acquiring an image including a portion depicting at least one target object by using a camera module (for example, the camera module 340), generating depth data for the at least one target object by using a ToF sensor (for example, the ToF sensor 350); measuring a first distance between the at least one target object and the electronic device, based on the depth data; pausing an operation of the ToF sensor when the calculated first distance is longer than a designated distance; while the operation of the ToF sensor is paused, measuring a second distance between the at least one target object and the electronic device, by using the camera module; and, when the measured second distance is within the designated distance, resuming the operation of the ToF sensor.

According to an embodiment, the operating method of the electronic device may include measuring the second distance based on an auto focusing function of the camera module.

According to an embodiment, the operating method of the electronic device may include providing notification information informing that the measured first distance is longer than the designated distance.

According to an embodiment, the method may include providing notification information including information for guiding movement of the electronic device to within the designated distance.

According to an embodiment, the operating method of the electronic device may include: when an input instructing the operation of the ToF sensor is received in a state where the measured first distance is longer than the designated distance, extending the designated distance; generating depth data regarding a target object of the at least one target object existing within the extended designated distance; and providing a service based on the generated depth data.

According to an embodiment, the operating method of the electronic device may include extending the designated distance by changing at least one of a frequency of radiation (for example, a frequency), a radiation period (for example, an exposure time), a frame rate of a light emitter (for example, the light emitter 352) related to the ToF sensor.

According to an embodiment, the operating method of the electronic device may include, when it is not possible to measure the second distance using the camera module, measuring the second distance using the ToF sensor.

According to an embodiment, the operating method of the electronic device may include, when it is not possible to measure the second distance by using the ToF sensor, terminating a function related to the ToF sensor.

According to an embodiment, the operating method of the electronic device may include: generating depth data while changing a measurement parameter of the reoperated ToF sensor; and providing a service based on the generated depth data. According to an embodiment, the measurement parameter may include at least one of a frequency of radiation, a radiation period, a frame rate of a light emitter related to the ToF sensor.

According to an embodiment, the operating method of the electronic device may include changing the measurement parameter based on at least one of a photographing mode or environmental information. According to an embodiment, the photographing mode may include at least one of a moving image mode or a still image mode. In addition, the environmental information may include at least one of a movement of the at least one target object, the number of the at least one target object, and a type of the target object.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

While specific embodiments have been described in the detailed descriptions of the disclosure, it will be understood by those skilled in the art that various changes may be made therein without departing from the spirit and scope of the disclosure. Therefore, the scope of the disclosure should be defined not by the described embodiments but by the appended claims or the equivalents to the claims.

The invention claimed is:

1. An electronic device comprising:
a camera module configured to acquire an image, wherein the image comprises a portion depicting at least one target object;
a Time of Flight (ToF) sensor configured to generate depth data regarding the at least one target object;
at least one processor operatively connected with the camera module and the ToF sensor; and
at least one memory operatively connected with the at least one processor,
wherein the at least one memory stores instructions that, when being executed, cause the at least one processor to perform a plurality of operations, the plurality of operations comprising:
while acquiring the image by using the camera module, measuring a first distance between the at least one target object and the electronic device, based on the depth data from the ToF sensor;
pause an operation of the ToF sensor when the measured first distance is longer than a designated distance;
while the operation of the ToF sensor is paused, measure a second distance between the at least one target object and the electronic device, using the camera module; and
when the measured second distance is within the designated distance, resume the operation of the ToF sensor.

2. The electronic device of claim 1, wherein the plurality of operations further comprises calculating the second distance based on an auto focusing function of the camera module.

3. The electronic device of claim 1, wherein the plurality of operations further comprises providing a notification that the measured first distance is longer than the designated distance.

4. The electronic device of claim 3, wherein the plurality of operations further comprises providing a notification including information for guiding movement of the electronic device to within the designated distance of the at least one target object.

5. The electronic device of claim 3, wherein the plurality of operations further comprises:
when an input instructing the operation of the ToF sensor is received in a state where the measured first distance is longer than the designated distance, extend the designated distance, to generate depth data regarding a target object of the at least one target object existing within the extended designated distance, and to provide a service based on the generated depth data.

6. The electronic device of claim 5, wherein the plurality of operations further comprises extending the designated distance by changing at least one of a frequency of radiation, a radiation period, a frame rate of a light emitter related to the ToF sensor.

7. The electronic device of claim 1, wherein the plurality of operations further comprises:
when it is not possible to measure the second distance using the camera module, measure the second distance using the ToF sensor.

8. The electronic device of claim 7, wherein the plurality of operations further comprises:
when it is not possible to calculate the second distance using the ToF sensor, terminate a function related to the ToF sensor.

9. The electronic device of claim 1, wherein the plurality of operations further comprises:
generating depth data while changing a measurement parameter of the ToF sensor; and
providing a service based on the generated depth data,
wherein the measurement parameter comprises at least one of a frequency of radiation, a radiation period, a frame rate of a light emitter related to the ToF sensor.

10. The electronic device of claim 9, wherein the plurality of operations further comprises changing the measurement parameter based on at least one of a photographing mode or environmental information,
wherein the photographing mode comprises at least one of a moving image mode or a still image mode, and
wherein the environmental information comprises at least one of a movement of the at least one target object, a number of the at least one target object, and a type of the at least one target object.

11. A method of operation of an electronic device, the method comprising:
while acquiring an image comprising a portion depicting at least one target object by a camera module, generating depth data for the at least one target object using a Time of Flight (ToF) sensor;
measuring a first distance between the at least one target object and the electronic device, based on the depth data;
pausing an operation of the ToF sensor when the measured first distance is longer than a designated distance;
while the operation of the ToF sensor is paused, measuring a second distance between the at least one target object and the electronic device, using the camera module; and
when the measured second distance is within the designated distance, resuming the operation of the ToF sensor.

12. The method of claim 11, comprising measuring the second distance based on an auto focusing function of the camera module.

13. The method of claim 11, comprising providing notification that the measured first distance is longer than the designated distance.

14. The method of claim 13, comprising providing notification information including information for guiding movement of the electronic device to within the designated distance.

15. The method of claim 13, comprising:
when an input instructing the operation of the ToF sensor is received in a state where the measured first distance is longer than the designated distance, extending the designated distance;
generating depth data regarding a target object of the at least one target object existing within the extended designated distance; and
providing a service based on the generated depth data.

16. The method of claim 15, further comprising:
extending the designated distance by changing at least one of a frequency of radiation, a radiation period, a frame rate of a light emitter related to the ToF sensor.

17. The method of claim 11, further comprising:
when it is not possible to calculate the second distance using the camera module, measuring the second distance using the ToF sensor.

18. The method of claim 17, further comprising:
when it is not possible to measure the second distance using the ToF sensor, terminating a function related to the ToF sensor.

19. The method of claim 11, further comprising:
generating depth data while changing a measurement parameter of the ToF sensor; and
providing a service based on the generated depth data,
wherein the measurement parameter comprises at least one of a frequency of radiation, a radiation period, a frame rate of a light emitter related to the ToF sensor.

20. The method of claim 19, further comprising:
changing the measurement parameter based on at least one of a photographing mode or environmental information,
wherein the photographing mode comprises at least one of a moving image mode or a still image mode, and
wherein the environmental information comprises at least one of a movement of the at least one target object, a number of the at least one target object, and a type of the at least one target object.

* * * * *